United States Patent
Sinn, Jr.

[11] 3,835,809
[45] Sept. 17, 1974

[54] DAMAGE INDICATOR

[76] Inventor: Harry Sinn, Jr., 116-05 227th St., Cambria Heights, N.Y. 11411

[22] Filed: June 21, 1973

[21] Appl. No.: 372,096

[52] U.S. Cl. ......................................... 116/114 AH
[51] Int. Cl. .......................................... G01p 15/02
[58] Field of Search.... 116/114 AH, 114 R; 73/492, 73/514

[56] References Cited
UNITED STATES PATENTS

| | | |
|---|---|---|
| 2,768,602 | 10/1956 | Eichholz et al. ............... 116/114 AH |
| 3,013,524 | 12/1961 | York .............................. 116/114 AH |
| 3,304,907 | 2/1967 | Block ............................. 116/114 R |
| 3,688,734 | 9/1972 | Davis et al. ................... 116/114 AH |

Primary Examiner—James J. Gill
Attorney, Agent, or Firm—Charles E. Temko

[57] ABSTRACT

A damage indicating device which has a safety tab keeping it in a "loaded" condition until it is attached to a container. The device has means urging an indicator to show that the container has been subjected to stress in excess of a predetermined amount, and inertia activated means which releases the indicator.

7 Claims, 5 Drawing Figures

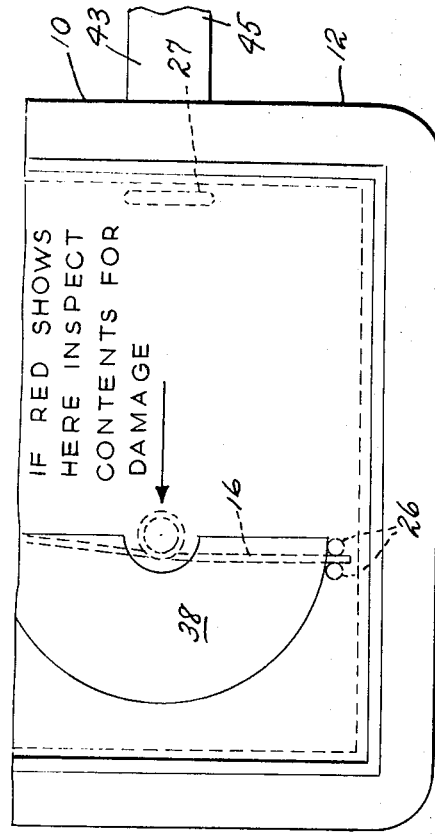
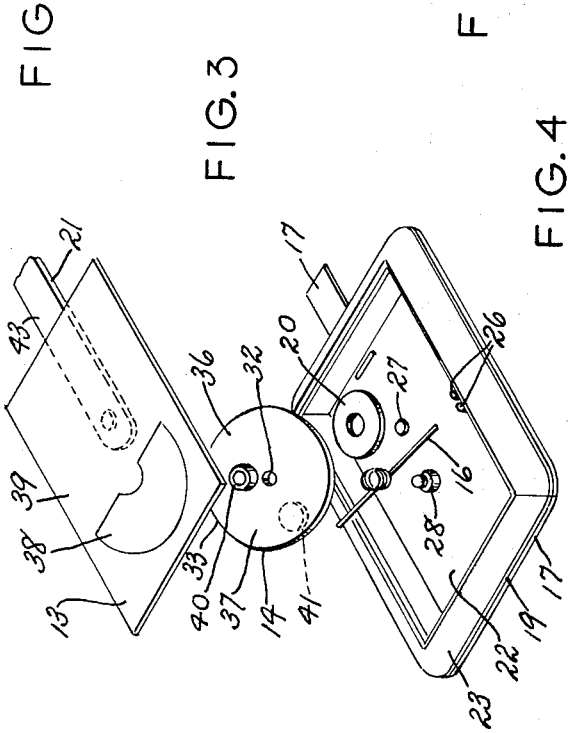
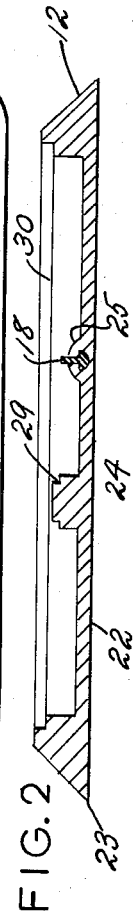
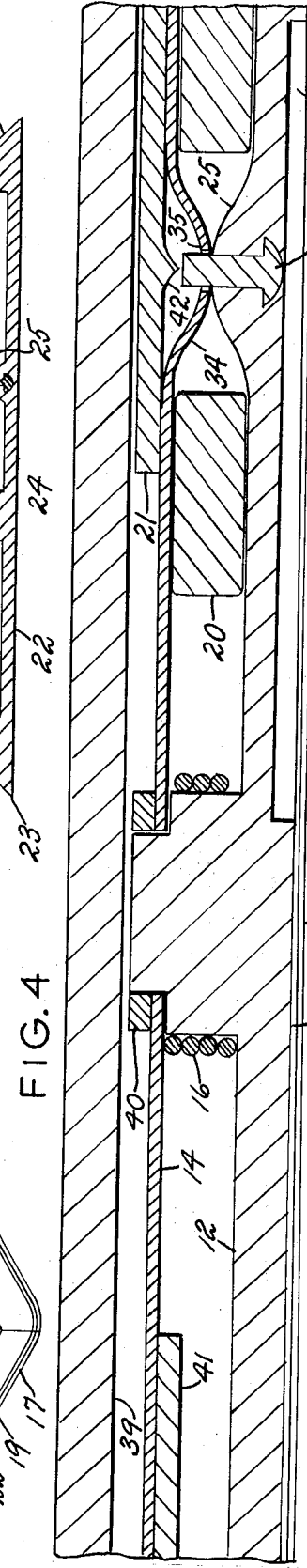
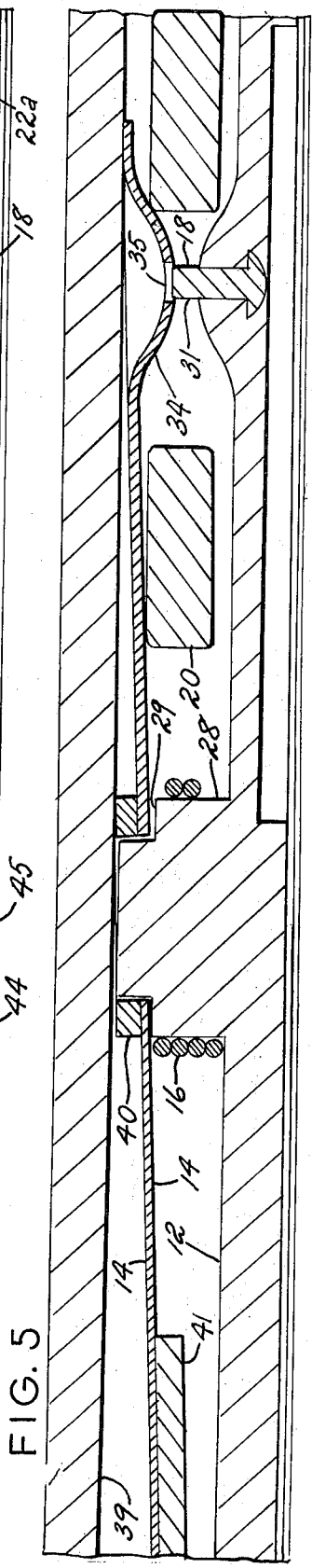

DAMAGE INDICATOR

BACKGROUND OF THE INVENTION

In this age of industrialization, businesses all over the world are shipping millions of tons of merchandise each year. Along with this industrial growth and growing at a faster rate is the problem of merchandise damage which has resulted from inadequate or improper handling.

The need for a means to detect whether a carton or an entire shipment of merchandise has been subjected to shock of sufficient magnitude to cause damage has become increasingly pressing. Literally millions of dollars are tied up in litigation and damage claims.

It is toward this problem that this invention is directed. It provides continuous monitoring to detect any damaging shock level from the end of a manufacturer's production line to the product's final destination (including handling, shipping, storage). In addition, the use of this device will also pinpoint the areas responsible for the damage avoiding litigation and lengthy damage claims.

BRIEF DESCRIPTION OF THE PRESENT INVENTION

All components of the damage indicator are fabricated on automatic machinery and all critical dimensions are built into the tooling. Assembly operations can be performed by unskilled labor using unsophisticated equipment.

The damage indicator is packaged as a flat rectangular plastic unit with a pressure sensitive adhesive so that it can be attached to a carton in the same manner as a paper label.

The damage indicator operates in accordance with a basic law of physics, that is: $F = ma$, or $F = mgt^2$. Of course the equations describing actual dynamic action involved are more complex. This device is equipped with a mass (selected according to the desired shock level) which has the shape of a flat washer. It is loosely located around a compressed hour-glass configuration formed by the mating portions of the bottom housing or base element and the indicating element or disc. These mating halves of the hour-glass provide camming surfaces upon which the mass rides under dynamic conditions. When the force of the mass has parted the opposite halves of the hour-glass sufficiently so that the disc clears the pin (in lower half of hour-glass) the preloaded indicating disc rotates 180° counterclockwise presenting a red visual indication through an indicator window.

The damage indicator is also equipped with a safety strip which prevents the indicator from being set off until it is used. This is accomplished when the backing is removed from the adhesive surface such that the safety strip is removed with the backing.

BRIEF DESCRIPTION OF THE DRAWINGS

In the drawings in which similar reference characters designate corresponding parts throughout the several views;

FIG. 1 is a fragmentary plan view of an embodiment of the invention;

FIG. 2 is a longitudinal central sectional view of the base element;

FIG. 3 is an exploded perspective view with the parts oriented in their loaded unreleased position;

FIG. 4 is an enlarged fragmentary longitudinal sectional view of the embodiment preparatory to use;

FIG. 5 is a view corresponding to FIG. 4 but showing the embodiment at the moment that the pin disengages from the indicator element or disc.

DETAILED DESCRIPTION OF THE DISCLOSED EMBODIMENT

In accordance with the invention the damage indicating device, generally indicated by reference character 10, comprises broadly: a base element 12; limiting means 13; an indicator element 14; indicator element moving means 16; restraining means 18; mass element 20; deactivating means 21; attaching means 19; and protective means 17.

The base element 12 is preferably of rectangular shape in the form of a shallow cup which may be an injection molding of synthetic resin such as black polystyrene. Element 12 forms a bottom housing, having a bottom wall 22, a peripheral rim 23, a bearing 24, a convex protuberance 25 and anchoring means 26. The bottom wall 22 at one end thereof has a slot 27 through which the deactivating means 21 penetrates, extends out of the housing and is connected to the protective means 17.

The rim 23 has an inwardly and upwardly facing rabbet 30 which is adapted to receive the limiting means 13, in the form of a rectangular cover member 39 composed of normally transparent synthetic resin such as polystyrene. The cover 39 is substantially translucent obtained by a "frosted" undersurface, while a smooth undersurface provides a window through which green surface 37 and the red surface 36 of the indicator element may be alternatively seen by the user. The bearing post 24 has the lower portion 28 thereof of enlarged diameter forming a shoulder 29.

The convex protuberance 25 holds a pin 31 molded in place and which is preferably composed of stainless steel which coacts with the indicator element 14.

Indicator element 14 is in the form of a planar disc composed of thin metal or plastic and having a central orifice 32 through which the upper end of the bearing 24 penetrates, the border of said orifice resting on the shoulder 29. A bearing washer 40 preferably composed of styrene lies on top of element 14 surrounding bearing post 24. The element 14 has a downwardly directed hook tab 33 which is engaged by the means 16 which urges the disc to rotate counterclockwise.

The indicator element 14 has a counterweight 41 on its lower surface and 180° opposite thereto has a downwardly projecting bulge 34 with a central hole 35 through which the upper end of the pin 31 projects when the device 10 is in loaded position (FIG. 4). The upper surface of the convex protuberance 25 and the lower surface of the bulge 34 in juxtaposition form a compressed hour-glass configuration about which the mass element 20 is loosely disposed. The mass element 20 is in the form of a washer preferably composed of stainless steel. As best seen in FIG. 5, movement of the mass element 20 coacts with the camming surfaces formed by the protuberance 25 and the bulge 34 to disengage the indicating element 14 from the pin 31 of the restraining means 18, and as soon as this occurs, the means 16 rotates the element 14 counterclockwise so that red portion 36 appears in the window 38 while the green portion 37 disappears beneath non-transparent portion of the cover 39 formed by the limiting means 13.

The deactivating means 21 is in the form of a safety strip 43 preferably of thin vinyl sheet stock. It has a dimple or downwardly directed positioning projection 42 which aids in assembly and prevents accidental shifting of the strip until it is positively removed. The means 21 when in place (FIG. 4) prevents the indicating element 14 from becoming disengaged from pin 18 regardless of pressure exerted by the mass element 20.

The lower surface of base element 12 is provided with the attaching means 19 which is preferably in the form of a layer of pressure sensitive adhesive 44 covered by the protective means 17 preferably in the form of a backing 45 of known release paper. The backing 45 and the strip 43 are interconnected so that when the user removes the backing 45 preparatory to putting the device 10 upon a package to be monitored the safety strip 43 is pulled out leaving the device in a cocked condition, the pin 31 being in the hole 35. If the container or object to which the device 10 is attached is decelerated at a predetermined rate, as when the container is dropped against the ground from a certain height or higher, the inertia of the mass element will separate the bulge 34 from the protuberance 25 and trigger the indicator element so that spring 16 moves it to its damage indicating position.

Assembly of the device 10 is simple. With the adhesive 44 and backing 45 in place, the spring 16, is placed on portion 28 with an end in the means 26. Mass 20 is placed on protuberance 25. Disc 14 by tab 33 is hooked on the other end of spring 16 and placed on post shoulder 29, and rotated, thus winding the spring, until pin 18 enters hole 35. Next bearing washer and strip 43 are put in place, the latter threaded through slot 27 and secured to backing 45 (see right hand portion of FIG. 1). Now the cover 39 is cemented in the rabbet 30. This makes the device tamper-proof.

It may be noted that despite the generally planar configuration of the device, the device is capable of sensing shock imparted to an associated package or container in any direction, both within the plane and at any angle with respect thereto. In the case of shock occurring within the plane of the device, the mass 20 cams against two surfaces 27 and 36 separating the two halves of the hourglass shape to clear the pin 18.

Should the shock, for example, occur directly normal to the plane of the device, and outwardly of the cover 39, the mass 20 contacts the disc 35 and the cover 39 to result in a force sufficient to clear the pin 18 within the tolerance established for the particular device 10.

Should the shock be in a direction away from the cover 39, the mass 20 acts against the recessed section 22a of the bottom housing 12 and flexes it. The resulting rebound imparts sufficient motion to the mass 20 to achieve the same result.

I wish it to be understood that I do not desire to be limited to the exact details of construction shown and described, for obvious modifications will occur to a person skilled in the art to which the present invention relates.

I claim:

1. A damage indicating device comprising: a generally planar base element, a planar indicator element pivotally mounted upon said base element for rotation between first and second positions, resilient means urging said indicator element to one of said positions, detent means on said base element radially spaced with respect to the axis of rotation of said indicator means, means including a resilient component on said indicator element detachably engaging said detent means, and a ring-shaped mass between said indicator element and said base element surrounding said detent means whereby a combination of inertia of the ring-shaped mass and a predetermined rate of deceleration of the base element serves to shift the mass so that said resilient component is deflected and said detent means is disengaged, and said resilient means shifts said indicator element to said second position.

2. Structure in accordance with claim 1, including limiting means which restricts axial displacement of said indicator element.

3. Structure in accordance with claim 2, in which the limiting means constitutes a cover for the base element, and is provided with a window portion for viewing the position of said indicator element.

4. Structure in accordance with claim 1, in which the detent means includes a protuberance on the base element, and a pin projecting from said protuberance.

5. Structure in accordance with claim 1, including deactivating means which prevents the indicator element from shifting from said first position.

6. Structure in accordance with claim 1, in which the base element has a protuberance and a fixed pin, and the indicator element includes a bulged portion with a orifice in which said pin is engaged when said indicator element is in said first position.

7. Structure in accordance with claim 1, including deactivation means which prevents the indicator element from shifting to said second position; the base including an adhesive layer on a bottom surface thereof, a selectively removable backing on said adhesive layer, said deactivating means and said backing being interconnected for concurrent removal.

* * * * *